Aug. 25, 1964  GIICHI TORII  3,145,720
CANOPY TILTING DEVICE
Filed Nov. 29, 1962
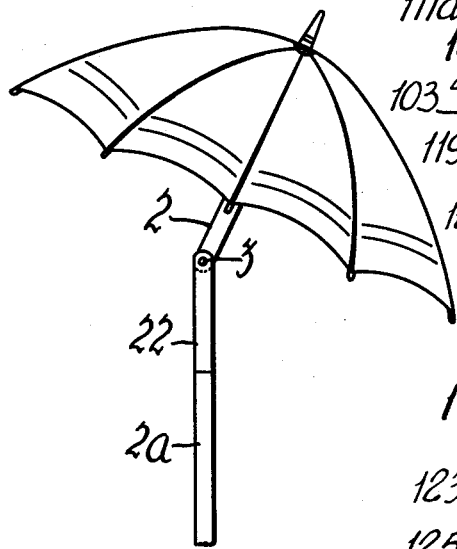
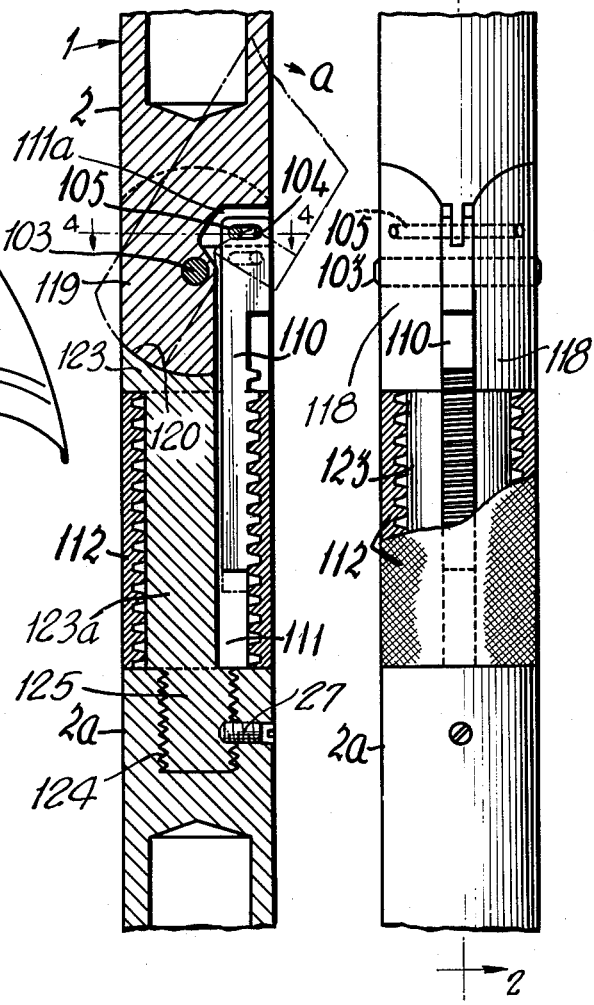
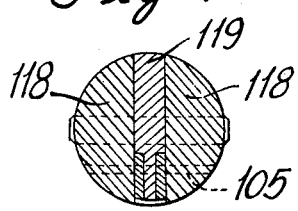
INVENTOR.

United States Patent Office 3,145,720
Patented Aug. 25, 1964

3,145,720
CANOPY TILTING DEVICE
Giichi Torii, 103 Fuminosato 3–chome, Osaka, Japan
Filed Nov. 29, 1962, Ser. No. 240,972
1 Claim. (Cl. 135—20)

This invention relates to a canopy tilting device for tilting a beach parasol at a joint in its support pole.

The main object of this invention is to provide a hinge joint connection for support poles so as to enable tilting of the canopy of a parasol at a required angle and to keep the canopy in the tilted position in a reliable manner and by a simple operation of rotating a section of pipe fitted on the pole.

The invention will be described further with reference to the accompanying drawings, wherein:

FIG. 1 is a front elevation of a beach parasol with the canopy in a tilted position relative to the support pole;

FIG. 2 is a sectional elevation of the hinged joint connection of the support pole taken on line 2—2 of FIG. 3;

FIG. 3 is a side elevation looking from right hand side of FIG. 2 and partly in section; and FIG. 4 is a sectional view taken on lines 4—4 of FIG. 2.

Referring to FIGS. 1–3, a support pole 1 is made of an upper member 2 and a lower member 2a, the adjacent ends of the members being hinged to each other on a pivot pin 103. The lower end of the upper member is provided with a downwardly extending and centrally disposed tongue 119, and the upper end of a lower member end portion 123a is provided with parallel extensions 118, 118 with a semicircular cross section (FIG. 4) and the tongue is positioned in the slot between the extensions and is closely fitted between the extensions. The tongue is rotatably mounted on the pivot pin 103, and the extreme end of the tongue has a circular profile and is in cotnact with a cylindrical surface 120 between extensions.

The upper extremity of the lower pole member 2a has a threaded recess 124 therein and the lower member end portion has a threaded extension 125 thereon threaded into the recess 124. Lower member end portion 123a has a part 123 of circular cross section and of slightly smaller diameter than the diameter of the pole 1. The extension 125 is firmly secured in the threaded recess 124.

An internally threaded hollow cylindrical sleeve 112 is rotatably mounted around the reduced cross sectional part 123.

A longitudinally extending groove 111 having a rectangular cross section is provided along and in one side of the lower member end portion 123a and in the lower end of the upper pole, and a toothed plate 110 which is shorter than but has substantially the same cross sectional area as the long groove 111 is slidably inserted in said groove with the teeth meshed with the internal threads of said sleeve 112, so that the plate 110 is lowered or raised in the hole if the sleeve 112 is rotated.

A laterally elongated hole 104 is provided in the upper end of the toothed plate, and the ends of a pin 105 are fixed to the parallel extensions 119 and the pin passes through said hole.

The upper end of the groove 111 is deeper in the lower extremity of the upper pole as shown at 11a in FIG. 2, so that the upper pole member can be pivotally turned in the direction a on the pin 103 without interfering with the toothed plate in the upper end of the groove.

When the sleeve 112 is turned in clockwise direction, the toothed plate 110 moves downwardly along the groove so that the upper pole member 2 is pivotally turned on the pin 103 as above mentioned whereby the canopy is tilted relative to the lower pole member as shown in FIG. 1.

The upper pole member is kept in a tilted position and the angle which it assumes relative to the lower pole member can be adjusted by turning the sleeve 112 in either direction.

I claim:

A canopy tilting device for a beach umbrella or the like, comprising an upper pole member adapted to carry the umbrella canopy, a lower pole member, said pole members having extensions extending toward each other and pivotally engaged with each other for pivoting of the pole members relative to each other, said lower pole member having a portion with a reduced cross-sectional area, an internally threaded hollow cylindrical sleeve rotatably mounted around said reduced cross-sectional area portion, said lower pole member having a groove along the surface thereof extending along said reduced cross-sectional area and said upper pole member having a groove along the surface thereof for a short distance into the lower end thereof, a toothed plate slidably mounted in said grooves and having the teeth engaged in the threads of said sleeve, the end of said plate adjacent said upper pole member having a laterally elongated aperture therein, and a pin mounted in said upper pole member eccentrically of the pivotal engagement of said pole members and extending through said aperture to pivotally engage the end of said plate and said upper pole member, the end of said groove in said upper pole member being deeper than the remainder of the groove to accommodate the end of said toothed plate when said upper pole member is at a relatively large angle to said lower pole member, whereby rotation of said sleeve moves said toothed plate up and down and pivots said upper pole member relative to said lower pole member.

References Cited in the file of this patent

UNITED STATES PATENTS

| 2,475,406 | Russell | July 5, 1949 |
| 2,607,363 | Frey | Aug. 19, 1952 |
| 3,044,478 | Russell | July 17, 1962 |

FOREIGN PATENTS

| 128,258 | Austria | May 25, 1932 |